United States Patent [19]
Savka et al.

[11] Patent Number: 6,006,549
[45] Date of Patent: Dec. 28, 1999

[54] BENDING MOLD HAVING SIDE MOUNTED WEIGHT ASSEMBLIES AND METHOD OF USE THEREOF

[75] Inventors: Mark M. Savka, Economy Borough; Rudolph A. Karlo, Creighton, both of Pa.

[73] Assignee: PPG Industries Ohio, Inc., Cleveland, Ohio

[21] Appl. No.: 09/191,009

[22] Filed: Nov. 12, 1998

[51] Int. Cl.[6] ............................. C03B 23/027; B28B 7/00; B28B 7/04

[52] U.S. Cl. ................................. 65/290; 65/107; 65/273; 65/291; 72/381; 264/297.7; 264/322; 264/339; 425/214; 425/383; 425/451.9

[58] Field of Search ........................... 65/273, 290, 291, 65/106, 107; 72/379.2, 381, 383, 384; 264/297.7, 322, 339; 425/214, 383, 451.9

[56] References Cited

U.S. PATENT DOCUMENTS

| | | |
|---|---|---|
| 3,238,034 | 3/1966 | Jendrisak .................................. 65/290 |
| 4,286,980 | 9/1981 | Matsuzaki et al. ....................... 65/106 |
| 4,687,501 | 8/1987 | Reese ....................................... 65/103 |
| 4,804,397 | 2/1989 | Stas et al. ................................. 65/107 |
| 5,178,659 | 1/1993 | Watanabe et al. ........................ 65/106 |
| 5,186,730 | 2/1993 | Weber ...................................... 65/289 |
| 5,695,537 | 12/1997 | Sykes ....................................... 65/106 |
| 5,849,057 | 3/1997 | Didelot .................................... 65/106 |

*Primary Examiner*—Sean Vincent
*Attorney, Agent, or Firm*—Donald C. Lepiane

[57] ABSTRACT

The invention provides an articulated bending mold for shaping heat softened substrates, e.g., glass sheets, into curved shapes. The bending mold has a central portion with at least one, and preferably two, pivoting end sections. A biasing assembly is mounted on the side of the mold between the end section pivot points, preferably outboard of the end section pivot points and in proximity to an outer side of the end section. The biasing assembly includes a weight arm with a linkage assembly mounted on one end of the weight arm and connected to the end section, preferably at or near an outer corner of the end section.

26 Claims, 3 Drawing Sheets

BENDING MOLD HAVING SIDE MOUNTED WEIGHT ASSEMBLIES AND METHOD OF USE THEREOF

BACKGROUND OF THE INVENTION

1. Field of the Invention

The invention relates generally to the forming of glass sheets and, more particularly, to a bending mold having side mounted weight assemblies for shaping hot glass sheets into curved shapes.

2. Description of the Prior Art

In the shaping of hot glass sheets, it is common practice to use a contoured, metal bending mold that supports a flat glass sheet and conveys it through a heating lehr, such as a tunnel lehr. An example of one such heating lehr is disclosed in U.S. Pat. No. 4,804,397 to Stas et al., which disclosure is herein incorporated by reference. As the temperature of the glass sheet increases and approaches its heat softening temperature, the sheet begins to sag under the force of gravity and conforms to the contours of the mold. The bending mold with the shaped glass sheet is then conveyed out of the lehr to cool.

Some conventional bending molds also include hinged or articulated end sections to help facilitate bending the sides of the glass sheet into sharp curvatures that could not normally be obtained through normal sag bending techniques. An example of one such articulated bending mold is disclosed in U.S. Pat. No. 4,687,501 to Reese, which disclosure is herein incorporated by reference. These articulated bending molds usually include a main frame having a central portion flanked by two pivoting end sections. Each end section is pivotally mounted on a pair of hinge blocks extending outwardly from the front and rear of the main frame. A pair of weight arms are connected to each end section inboard of the hinge blocks and extend along the front and rear of the central portion of the mold. The weight arms are configured to bias the end sections upwardly under the influence of gravity when the glass sheet reaches its softening temperature to shape the glass sheet.

While generally acceptable for bending and shaping glass sheets, such conventional articulated bending molds have limitations. For example, two weight arms are mounted on the leading edge of the mold as it moves through the lehr and are attached to the respective front ends of the end sections inboard of the front hinge blocks. Two additional weight arms are mounted on the trailing edge of the mold and are attached to the respective rear ends of the end sections inboard of the rear hinge blocks. These weight arms and hinge blocks typically extend several inches beyond the leading and trailing edges of the bending mold, increasing the overall length of the bending mold.

In a conventional bending process, overall productivity depends, among other things, upon the number of bending molds which can be processed through the lehr in a given period of time and thus the spacing between adjacent molds being conveyed through the lehr is a significant factor. Because of the leading edge and trailing edge mounted weight arms and hinge blocks of the prior art, adjacent bending molds must be spaced relatively far apart in a tunnel lehr thereby decreasing the number of bending molds which can be moved through the lehr in a given period of time.

Additionally, the conventional mounting of the hinge blocks and weight arms of the prior art results in four weight arms and hinge blocks located between the glass supporting portions of adjacent bending molds as the molds move through the lehr. This mass of metal absorbs and radiates heat differently than the glass sheets, adversely impacting the heating uniformity of the lehr.

Further, conventional weight arms typically have a relatively long attachment length between the weight and the hinge block and thus the weight arms flex, which can adversely impact upon the force being applied to the ends of the end sections, adversely impacting the final shape of the glass sheet and resulting in the rejection of the shaped glass.

As can now be appreciated, it would be advantageous to provide bending molds and methods of bending glass which do not have the drawbacks or limitations of the presently available bending molds and methods.

SUMMARY OF THE INVENTION

The invention relates to an articulated bending mold for shaping heat softened sheets, e.g., glass sheets. The bending mold has a central portion with at least one, and preferably two, pivoting end sections. Force applying facilities, e.g., weight assemblies, are mounted on the sides of the mold between the pivot points of the end section and preferably in proximity to the outer side of the associated end section. The weight assemblies include a weight arm with a linkage assembly mounted on the end of the weight arm and connected to the associated end section, preferably at or near an outer corner of the end section. Mounting the weight assemblies on the sides of the bending mold decreases the front to rear length of the mold as it moves through the lehr. Additionally, connecting the end of the weight arm at or near the outer corner of the end section provides support for the end section during the bending process.

The invention also relates to a method of shaping a sheet, e.g., a glass sheet, using a mold embodying features of the invention.

BRIEF DESCRIPTION OF THE DRAWINGS

In the following description and drawings, like reference numbers identify like parts throughout.

DESCRIPTION OF THE PREFERRED EMBODIMENTS

Figure 1:
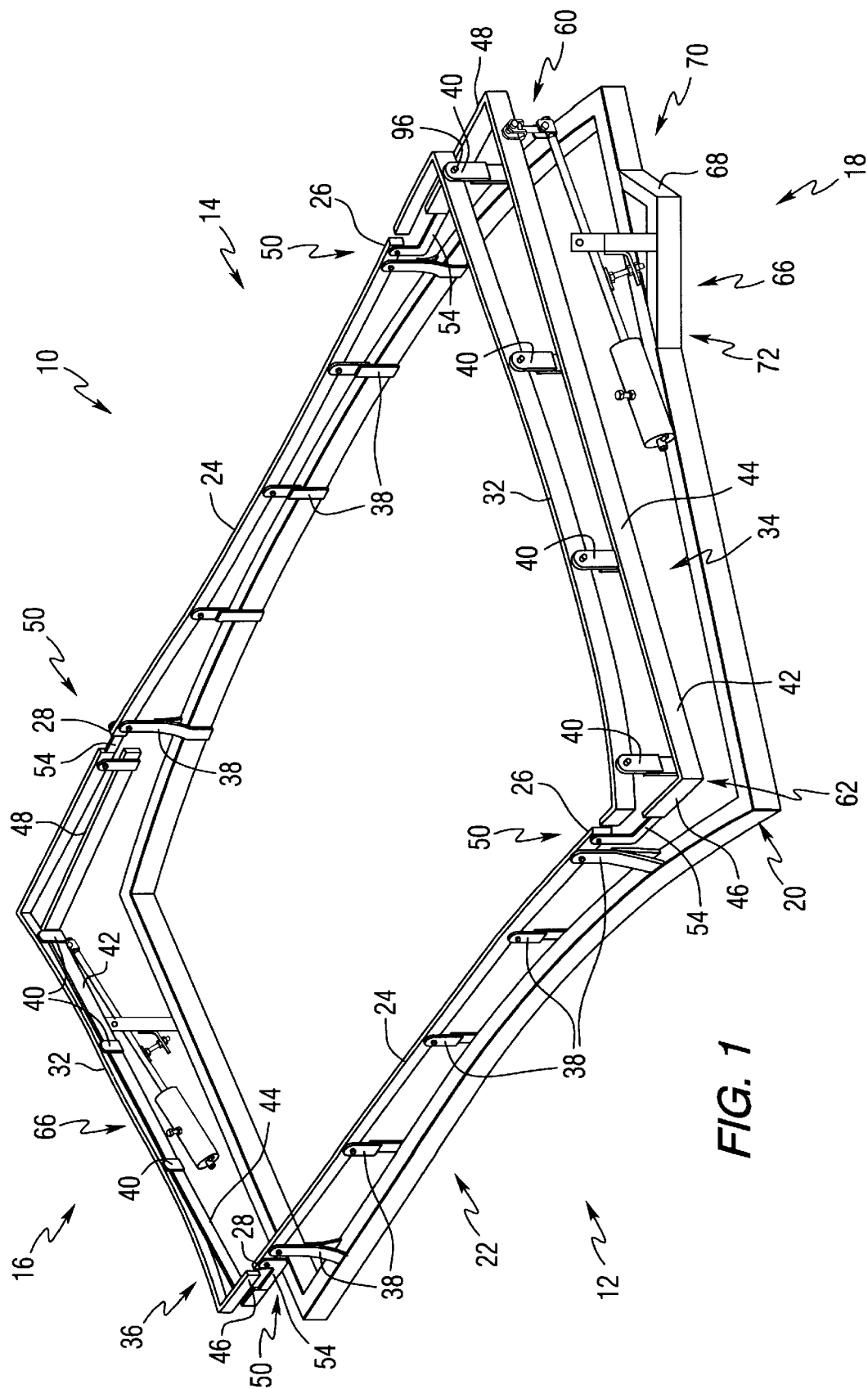
FIG. 1 is a perspective view of a bending mold of the invention.

For purposes of the description hereinafter, the terms "front", "rear", "right", "left", "top", "bottom", "above", "below" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

A bending mold of the invention is generally designated 10 in FIG. 1 of the drawings. For purposes of discussion and not to be considered as limiting to the invention, the bending mold 10 has a front 12, a rear 14, a left side 16 and a right side 18. Although not limiting to the invention, in the following discussion the front 12 may be considered the leading edge and the rear 14 may be considered the trailing edge of the mold 10 as it moves through a lehr. The bending mold 10 includes a support or main frame 20 with a central portion 22 having a pair of spaced apart central shaping rails 24 mounted thereon. Each central shaping rail 24 has a first end 26 and a second end 28. As is known in the art, the central shaping rails 24 have a contour to provide the central portion of the sheet to be shaped with a desired contour.

End shaping rails 32 are located on mold end sections 34 and 36 pivotally mounted on the mold 10 in a manner to be described below for movement toward and away from the main frame 20. The central shaping rails 24 are mounted on the main frame 20 in any usual or conventional manner, such as by support members 38, as shown in FIG. 1. The end shaping rails 32 may be mounted by support members 40 on a strengthening or reinforcing bar 42. The rails 24 and 32 are shaped to provide the desired contour of the shaped sheet. More particularly, when the sheet to be shaped, e.g., a flat glass sheet, is to be placed on the mold 10, the end sections 34 and 36 are pivoted downwardly as discussed in more detail below to open the mold 10, i.e., to pivot the end sections 34 and 36 toward the main frame 20. When the flat glass is in position on the mold 10, the weight of the glass sheet holds the mold 10 in this open position. As the glass sheet heats and softens in the lehr, the end sections 34 and 36 move upwardly away from the main frame 20 as discussed below and shown in FIG. 1 to shape the glass sheet to the desired contour.

Both end sections 34 and 36 are structurally similar, therefore only end section 34 will be described in detail, with the understanding that the discussion also relates to end section 36 unless otherwise indicated. As shown in FIG. 1, the end section 34 has a generally "C" shape, with the reinforcing bar 42 having an elongated member or side portion 44 with legs or end portions 46 and 48 at the ends thereof. While in the preferred embodiment of the invention the end sections 34 and 36 are substantially C-shaped, the invention is not limited to end sections of such shape. The end sections 34 and 36 and associated shaping rails 32 and/or reinforcing bars 42 could be of any required shape, such as rectangular, semi-circular, elliptical, etc. A side portion 44, generally known as an "A-post" in the art, extends along each of the sides 16 and 18 of the bending mold 10. The end portions 46 and 48 of the end section 34 are movably, e.g., pivotally, mounted adjacent the first ends 26 of the central shaping rails 24 by hinge members 50. The end section 36 is similarly movably mounted adjacent the second ends 28 of the central shaping rails. The hinge members 50 define the mounting or pivot points for the end sections 34 and 36.

For example, as shown in FIG. 1, the hinge members 50 may be embodied as metal extension pieces 54 extending between and pivotally connecting the central portion 22 with the end section 34. One end of the extension piece 54 is attached to the adjacent end portion 46 or 48 of the end section 34, e.g., may be connected to or integral with the reinforcing bar 42 or the end shaping rail 32, and the other end is pivotally mounted in conventional manner, e.g., pivot pin, rocker mount, etc. on the first end 26 of the respective adjacent central shaping rail 24 to allow the end section 34 to move or pivot with respect to the central portion 22.

Figure 2:
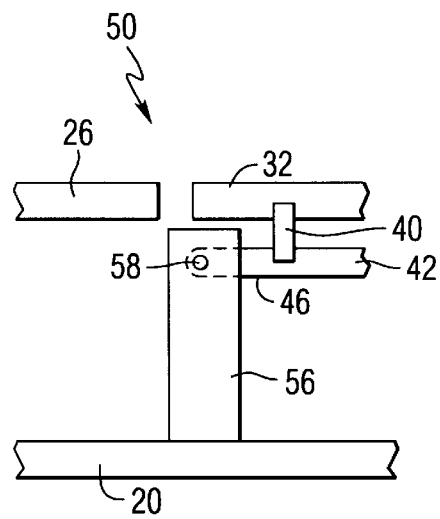
FIG. 2 is a side, broken view of a hinge assembly of the invention.

An alternative embodiment of the hinge member 50 is shown in FIG. 2 and is embodied as a hinge post 56 mounted on the main frame 20, with an end portion, e.g., end portion 46 of the end section 34, pivotally connected to the hinge post 56 in conventional manner, such as by a pivot pin 58. Since the hinge post 56 does not support an associated weight arm as in the prior art, it may be smaller and does not have to be spaced away from the front 12 of the bending mold 10.

In shaping glass sheets, it is not uncommon for one end of the glass sheet to be wider than the other end of the glass sheet, e.g., for automotive windshields the portion of the glass sheet forming the top of the windshield will be narrower than the portion forming the bottom of the windshield as mounted in an automobile. Thus, one corner of the end section 34, e.g., rear corner 60 in FIG. 1, may be spaced farther from its associated hinge point than the other, front corner 62. While the corners 60 and 62 are shown in FIG. 1 as being substantially angular, corners 60 and 62, and associated shaping rail 30 and/or reinforcing bar 42, could be contoured or curved. The term "corner" is used broadly herein to describe an area or portion of the end section in which the shape of the end section or shaping rail changes from extending substantially parallel to the front or rear edges of the mold to be substantially perpendicular to the front or rear edges. Additionally, while the end portions 46 and 48 shown in FIG. 1 extend substantially perpendicularly to the side portion 44, these end portions 46 and 48 can be curved to approach the end of the central shaping rails 24 at an angle.

Referring back to FIG. 1, a force applying device or a biasing device is mounted on each side 16 and 18 of the bending mold 10. These force applying devices may be of any conventional type, such as a weight and pulley device, spring device or adjustable weight device. In the preferred embodiment, the force applying devices are configured as slidable weight assemblies 66. Since both weight assemblies 66 are structurally similar, only the weight assembly 66 on the right side 18 of the bending mold 10 shown in FIG. 1 will be described in detail, with the understanding that the discussion is also applicable to the other weight assembly 60 on the left side 16. The weight assembly 66 may be mounted directly on the main frame 20 or, as shown in FIG. 1, on a platform 68 extending from the right side 18 of the main frame 20. The weight assembly 66 is positioned between the front and rear hinge members 50, preferably in proximity to the side portion 44, of the end section 34.

Figure 3:
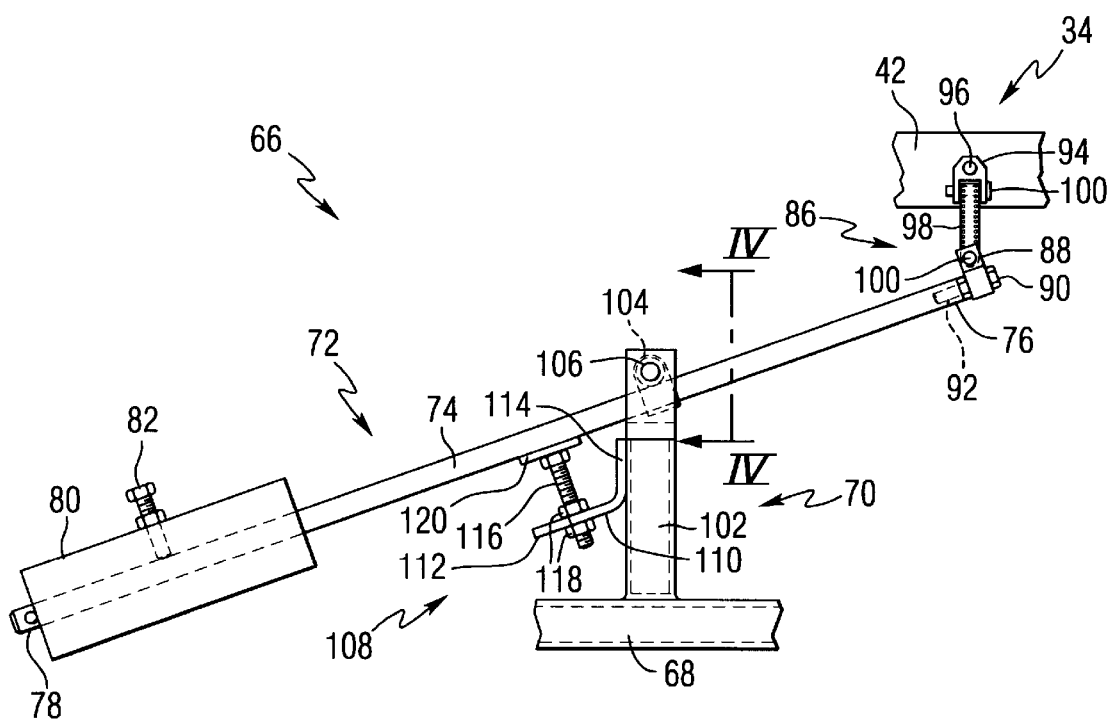
FIG. 3 is a side view of a weight assembly of the invention shown on the mold of FIG. 1.

The weight assembly 66 includes a hinge assembly 70 with a weight arm 72 pivotally carried on the hinge assembly 70. As shown in FIGS. 1 and 3, the weight arm 72 includes a rod 74 having a first end 76 and an opposite or second end 78. A weight 80 is slidable along the rod 74 adjacent the second end 78. As is appreciated by those skilled in the art, decreasing the distance of the weight 80 from the hinge assembly 70 decreases the force exerted by the weight assembly 66 on the end section 34, and vice versa. A locking member 82, such as a bolt or screw, is mounted on the weight 80 such that the position of the weight 80 along the rod 74 can be selectively set to adjust the force applied to the end section 34. The weight arm 72 is located between the associated hinge members 50, and preferably extends along the side portion 44, of the end section 34.

A connection assembly 86 is mounted on the first end 76 of the rod 74. The connection assembly 86 is preferably an articulated linkage having a first pivot member, such as a first U-joint 88, connected to the rod 74, for example by a screw or bolt 90 engaging a threaded bore 92 in the first end 76 of the rod 74. A second pivot member, such as a second U-joint 94, is connected to the end section 34, e.g., the reinforcing bar 42, at or near the rear corner 60, for example by a connection post 96 extending from the end section 34. A connecting link 98 extends between, and is pivotally connected to, the first and second U-joints 88 and 94, for example by pivot pins 100.

Figure 4:
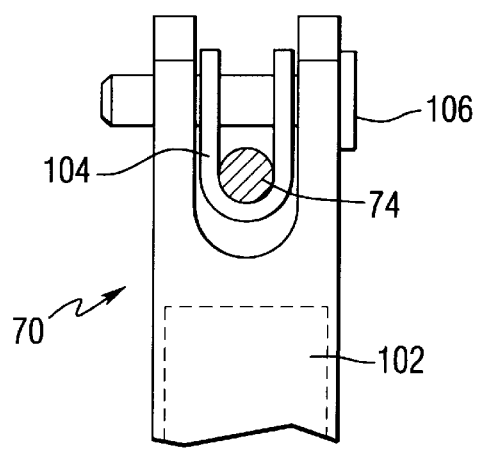
FIG. 4 is a front, sectional view taken along line IV—IV of FIG. 3.

As shown in FIGS. 3 and 4, the hinge assembly 70 includes a body 102 with a cradle 104 pivotally mounted in the body 102, such as by a pivot pin 106. The rod 74 is connected to the cradle 104 in conventional manner, such as by welding, such that the rod 74 is pivotal around the pivot pin 106. An adjustable stop mechanism 108 is mounted on the hinge assembly 70 and is configured to limit the downward movement of the weighted or second end 78 of the rod 74. The stop mechanism 108 includes a stop member 110 having a leg 112 angled with respect to another leg 114 and attached to the body 102. An extensible or movable element, such as a threaded bolt 116, is threadably received in the stop member 110 and is held in place, e.g., by engaging a pair of nuts 118. A stop plate 120 is mounted on the upper end of the bolt 116 and stops the downward movement of the second end 78 of the rod 74. Turning the bolt 116 adjusts the stopping point of the rod 74.

Figure 5:
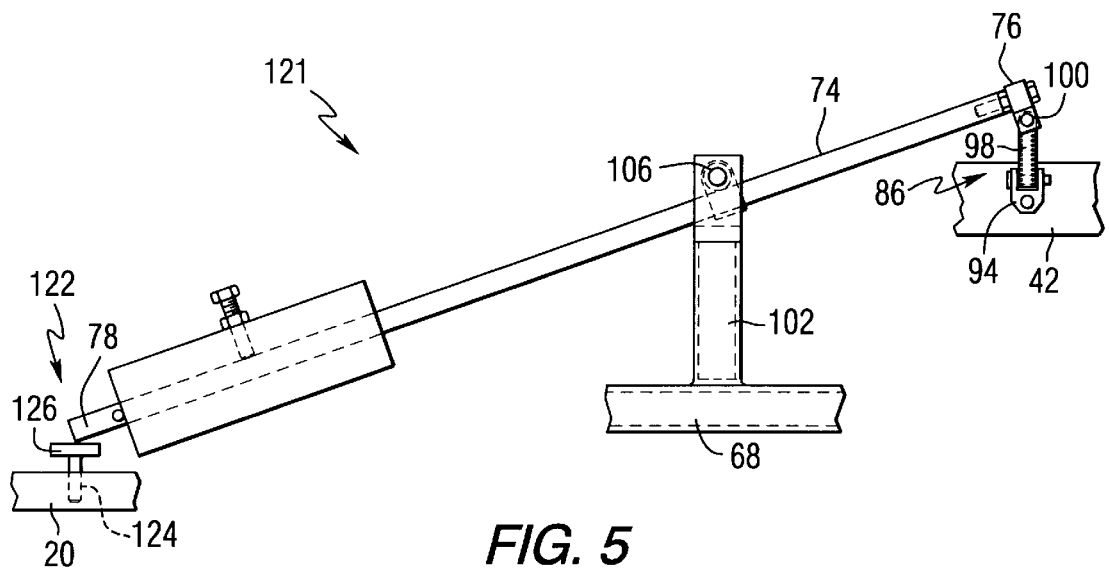
FIG. 5 is an alternative embodiment of the weight assembly shown in FIG. 2.

An alternative embodiment of the weight assembly is designated 121 in FIG. 5. In this embodiment, the connection assembly 86 is positioned with the first end 76 of the rod 74 located above the second U-joint 94. A stop mechanism 122 replaces the stop mechanism 108. The stop mechanism 122 includes a vertically extensible or movable element, such as a threaded bolt screw 124, attached to the main frame 20 or the platform 68 (see FIG. 1). The screw 124 has a stop plate 126 and the height of the stop plate 126 may be adjusted by turning the screw 124. The stop plate 126 is configured to contact the second end 78 of the rod 74 to prevent further downward movement of the rod 74.

Operation of the invention will now be described with particular reference to the bending mold 10 and weight assembly 66 shown in FIGS. 1, 3 and 4. The two end sections 34 and 36 are pivoted downwardly in conventional manner, such as by mechanically lifting the second end 78 of each weight arm 72 pivoting the second end 78 of the rod 74 upwardly and raising the weight 80. A piece of flat glass (not shown) to be shaped is placed on the bending mold 10, with the glass contacting portions of the shaping rails 24 and 32. With a conventional tunnel lehr, a number of such loaded bending molds 10 are placed consecutively on a conveyor which transports the bending molds 10 through the lehr. As the glass heats and softens, the force of gravity on the weight 80 causes the second end 78 of the rod 74 to pivot downwardly around the hinge assembly 70, which simultaneously pivots the first end 76 upwardly exerting a force on the associated end section 34 or 36 through the connection assembly 86. This movement occurs in a plane generally transverse to the shaping rail 24 or parallel to the end shaping rail 32, and continues until the rod 74 contacts the stop plate 120. Adjusting the length of the bolt 116 controls the stopping position of the end sections 34 and 36 and hence the final shape of the shaped glass product.

As the first end 76 of the rod 74 moves upwardly, the first U-joint 88 pivots around the associated pivot pin 100 while pushing the connecting link 98 upwardly. Since the path of movement of the side portion 44 is arcuate as the associated end section 34 or 36 pivots around the hinge members 50, the second U-joint 94 allows the connecting link 98 to pivot around the second U-joint 94 during this arcuate movement, i.e., the axis of rotation of the second U-joint 94 is substantially perpendicular to the axis of rotation of the first U-joint 88.

Since the weight arms 72 of the present invention are mounted on the left and right sides 16 and 18 of the bending mold 10 as the mold 10 moves through the lehr rather than the front 12 and rear 14 as a mold moves through the lehr as disclosed in the prior art, adjacent bending molds 10 can be placed closer together. This increases the overall productivity of the bending operation. Additionally, unlike prior art bending molds, no weight arms and weights are located between adjacent molds as the molds move through the lehr (not shown). This eliminates the heating problems described above associated with having such a metal mass located between adjacent molds. Although not preferred, the molds 10 could be placed with their sides adjacent to one another on the conveyor.

In the present invention, the first end 76 of the weight arm 72 is connected to and supports the outermost corner 60 of the associated end section 34 or 36 during bending. This provides a three point support for each end section 34 or 36, i.e., the two hinge assemblies 50 supporting the inner ends of the associated end section 34 or 36 and the weight arm 72 directly supporting the rear corner 60, rather than the two point support of the prior art devices. Providing this three point support increases the stability of the bending mold 10 during the shaping process and also helps prevent twisting or flexing of the end sections 34 and 36. The force of the weight arm 72 is applied directly to the area where it is needed most, i.e., the outermost, rear corner 60 of each end section 34 and 36. Applying the force of the weight arm 72 at or near the outer corner 60 helps reduce tip curling, i.e., regions of excessive curvature at the outermost corners of the glass sheet. Additionally, with only one weight arm 72 acting on each end section 34 or 36, the torquing and flexing problems encountered in the prior art bending molds are diminished or eliminated.

Using molds incorporating features of the invention means that fewer of the shaped glass articles will be twisted or distorted during the bending process, equating to fewer rejected products and an increase in the productivity of the bending operation.

The weight assembly 121 shown in FIG. 5 functions in similar manner as described above. As the glass softens, the weight 80 pivots the weight arm 72 around the hinge assembly 70, pulling the associated end section 34 or 36 upwardly at the connection point of the connection assembly 86. This upward movement ceases when the second end 78 of the rod 74 contacts the stop plate 126. The vertical position of the stop plate 126 determines the final position of the end section 34 or 36.

While in the preferred embodiments described above only one weight assembly 66 or 121 is mounted on each side of the bending mold 10, the invention is not limited to only one such weight assembly 66 or 121 per side. For example, if one or both of the end sections 34 or 36 were substantially rectangularly shaped having both front and rear corners, two weight assemblies could be mounted on each side of the mold 10, with one weight assembly connected to the front corner and one weight assembly connected to the rear corner. Although in the preferred embodiment each end section 34 and 36 is formed by a reinforcing bar 42 having an attached shaping rail 32, the reinforcing bar 42 could be eliminated and the end sections comprised of simply the shaping rails 32 pivotally mounted on the mold 10, e.g., mounted on or adjacent the respective ends 26 and 28 of the central shaping rails 24.

It will readily be appreciated by those skilled in the art that modifications may be made to the invention without departing from the concepts disclosed in the foregoing description. Such modifications are to be considered as included within the scope of the invention. Accordingly, the particular embodiments described in detail hereinabove are illustrative only and are not limiting as to the scope of the invention, which is to be given the full breadth of the appended claims and any and all equivalents thereof.

We claim:

1. A bending mold, comprising:
    a support;
    a pair of elongated central shaping rails mounted in spaced relationship to one another on said support, each of said central shaping rails extending in a predetermined direction and having a first end;
    at least one end section having spaced end portions, said end portions movably mounted at mounting points substantially adjacent said first end of each of said central shaping rails, said end section including a side shaping rail; and
    a weighted member connected to said end section and mounted between said mounting points for movement along a reciprocating path toward and away from said support, the reciprocating path in a plane transverse to the predetermined direction of the central shaping rails wherein movement of the weighted member in one direction along the reciprocating path applies a force to said end section.

2. The bending mold as claimed in claim 1, wherein said weighted member includes a weight mounted on a rod with the rod connected to said support.

3. The bending mold as claimed in claim 1, wherein said side shaping rail is mounted on a reinforcing bar.

4. The bending mold as claimed in claim 1, wherein said end section is pivotally mounted on said mold for movement toward said support defined as a first direction and movement away from said support defined as a second direction.

5. The bending mold as claimed in claim 4, wherein said weighted member is a biasing means and the one direction along the reciprocating path is the second direction.

6. The bending mold as claimed in claim 5, wherein said biasing means includes a weight assembly having a weight arm pivotally mounted on a hinge assembly, said weight arm including a rod having a first end and a second end with said first end of said rod connected to said end section by a linkage assembly.

7. The bending mold as claimed in claim 6, wherein said end section includes a side portion located between said spaced end portions and wherein said weight assembly extends substantially along said side portion.

8. The bending mold as claimed in claim 6, wherein said linkage assembly includes a first pivot member connected to said first end of said rod, a second pivot member connected to said end section and a connecting link extending between and pivotally connected to said first and second pivot members.

9. The bending mold as claimed in claim 6, wherein said end section includes at least one corner and, wherein said first end of said rod is connected to said end section at or near said corner.

10. The bending mold as claimed in claim 6, wherein said hinge assembly includes a cradle, with said rod connected to said cradle.

11. The bending mold as claimed in claim 6, including a stop mechanism mounted on said mold, said stop mechanism configured to restrict a range of motion of said weight arm with respect to said mold.

12. The bending mold as claimed in claim 6, wherein said weight assembly includes a weight slidable along at least a portion of said rod and a locking member, said locking member configured to releasably hold said weight at a selected position along said rod.

13. The bending mold as claimed in claim 6, including a connection post mounted on said end section, with said linkage assembly connected to said connection post.

14. The bending mold as claimed in claim 1, wherein said weighted member is mounted on a platform connected to said support outboard of said mounting points.

15. The bending mold as claimed in claim 14, wherein the weighted member includes a weight on a cylindrical rod, the end portion of the rod has a first member defined as a first pivot member and the end section has a pivot member defined as a second pivot member, wherein said first and second pivot members are U-joints which are interconnected.

16. The bending mold as claimed in claim 15, wherein said first pivot member has an axis of rotation substantially perpendicular to an axis of rotation of said second pivot member.

17. The bending mold as claimed in claim 1, wherein each of the central shaping rails has a second end and the bending mold includes a second end section movably mounted at second mounting points substantially adjacent said second end of each of said central shaping rails.

18. The bending mold as claimed in claim 17, including second weighted member acting on said second end section between said second mounting points to apply a force to said second end section.

19. The bending mold as claimed in claim 18, wherein said second weighted member includes a weight assembly having a weight arm pivotally mounted on a hinge assembly, said weight arm including a rod having a first end and a second end with said first end of said rod connected to said second end section by a linkage assembly.

20. The bending mold as claimed in claim 19, wherein said second end section includes at least one corner, with said first end of said rod connected to said second end section at or near said corner.

21. A bending mold for shaping a glass sheet to a desired contour, the bending mold comprising:
    a support;
    a central portion having a plurality of spaced central shaping rails, the central shaping rails extending in a predetermined generally horizontal direction;
    at least one movable end section having an end shaping rail pivotally mounted adjacent the central portion at spaced pivot points; and
    a weighted member located between said pivot points and connected to said end section, said weighted member mounted for movement in a path lying in a plane generally transverse to the direction of the shaping rail to bias said end section away from said support.

22. The bending mold as claimed in claim 21, wherein weighted member includes a weight assembly carried on said support and connected to said end section.

23. The bending mold as claimed in claim 22, wherein said weight assembly includes a weight arm and said weight arm is connected to said end section by a linkage assembly.

24. The bending mold as claimed in claim 22, wherein said support includes a platform, with said weight assembly mounted on said platform.

25. A bending mold, comprising:
    a support;
    a pair of central shaping rails, the central shaping rails mounted in spaced relationship to one another on said support, each of said central shaping rails having a first end and a second end and having a longitudinal axis;

a first end section having spaced end portions, said end portions movably mounted at mounting points substantially adjacent said first end of each of said central shaping rails, said first end section including a first side shaping rail and also including a first corner;

a second end section having spaced end portions, said end portions movably mounted at mounting points substantially adjacent said second end of each of said central shaping rails, said second end section including a second side shaping rail and also including a second corner, wherein said first and second end sections are mounted for movement toward said support defined as a first direction and movement away from said support defined as a second direction;

a first weight assembly located between said mounting points of said first end section and mounted for movement along a reciprocal path in a plane generally transverse to the longitudinal axis of the shaping rails, said first weight assembly connected to said first end section at or near said first corner; and a second weight assembly located between said mounting points of said second end section and mounted for movement along a reciprocating path in a plane generally transverse to the longitudinal axis of the shaping rails, said second weight assembly connected to said second end section at or near said second corner, wherein said first and second weight assemblies bias said first and second end sections, respectively, toward the second direction.

26. A method of shaping a substrate to a desired curvature, comprising the steps of:

supporting the substrate on a bending mold, the bending mold having spaced central shaping rails mounted on a support and extending in a predetermined direction at least one movable end section mounted on a side of the bending mold adjacent an end of the shaping rails at mounting points;

moving the bending mold through a heating lehr in a first direction;

heating the supported substrate within the lehr to a temperature within a deformation temperature range of the substrate, wherein portions of the substrate supported on the central shaping rails are shaped; and applying a biasing force to the end section between said mounting points by way of a weighted member moving along a path lying in a plane generally parallel to the path of travel of the bending mold to shape the portion of the sheets engaged by the moveable end portion.

* * * * *